US007016912B2

(12) United States Patent
Pasumansky et al.

(10) Patent No.: US 7,016,912 B2
(45) Date of Patent: *Mar. 21, 2006

(54) WRITE-BACK TO CELLS (75) Inventors: Mosha Pasumansky, Bellevue, WA (US); Amir Netz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/863,188

(22) Filed: Jun. 8, 2004

(65) Prior Publication Data

US 2004/0225692 A1 Nov. 11, 2004

Related U.S. Application Data (63) Continuation of application No. 09/453,193, filed on Dec. 2, 1999, now Pat. No. 6,766,325.

(51) Int. Cl.
G06F 17/30 (2006.01)

(52) U.S. Cl. .......................... 707/101; 707/2; 707/102; 707/103.4; 707/104.1; 707/200; 707/203; 707/5; 709/207; 709/219; 711/131

(58) Field of Classification Search ................ 707/10, 707/101, 102, 103, 104, 2, 103.4, 104.1, 707/200, 203, 5; 711/131; 709/204, 219
See application file for complete search history.

(56) References Cited

U.S. PATENT DOCUMENTS

| 5,751,958 A | 5/1998 | Zweben et al. ............. 700/266 |
| 5,918,232 A | 6/1999 | Pouschine et al. .......... 707/103 |
| 5,978,788 A | 11/1999 | Castelli et al. ................. 707/2 |
| 6,026,413 A * | 2/2000 | Challenger et al. ......... 707/202 |
| 6,055,606 A | 4/2000 | Sharma ...................... 711/131 |
| 6,094,651 A | 7/2000 | Agrawal et al. ............... 707/5 |
| 6,205,447 B1 | 3/2001 | Malloy ....................... 707/102 |
| 6,216,212 B1 * | 4/2001 | Challenger et al. ......... 711/163 |
| 6,223,171 B1 | 4/2001 | Chaudhuri et al. ............ 707/2 |
| 6,289,352 B1 | 9/2001 | Proctor ....................... 707/102 |
| 6,377,957 B1 * | 4/2002 | Jeyaraman .................. 707/200 |
| 6,408,282 B1 | 6/2002 | Buist ........................... 705/37 |
| 6,438,565 B1 | 8/2002 | Ammirato et al. .......... 707/503 |
| 6,484,010 B1 | 11/2002 | Sheehan ...................... 434/362 |
| 6,542,895 B1 | 4/2003 | DeKimpe et al. ............ 707/101 |
| 6,677,963 B1 | 1/2004 | Mani et al. ................. 345/764 |
| 6,775,695 B1 * | 8/2004 | Sarukkai ..................... 709/219 |
| 2002/0023040 A1 | 2/2002 | Gilman et al. ................ 705/37 |

OTHER PUBLICATIONS

Blake, et al., "Delta Service in a Mobile File System Client Cache" IEEE, 1998, 222-228.

* cited by examiner

Primary Examiner—Thuy N. Pardo
(74) Attorney, Agent, or Firm—Woodcock Washburn LLP (57) ABSTRACT Maintaining data used for performing "what-if" analysis is disclosed. The systems and methods of the invention define an efficient mechanism allowing a user to specify how base values from a database are to be changed. The changes can be held in a local delta cache which is only exposed to a single user, leaving the base data unchanged. The changes can also be maintained in a write-back partition, which results in the changes being exposed to all clients of the database. Values in the write-back partition can be selectively rolled back if required.

40 Claims, 5 Drawing Sheets

WRITE-BACK TO CELLS

CROSS-REFERENCE TO RELATED APPLICATIONS

This application is a continuation application and claims priority under 35 U.S.C. § 120 and § 121 to U.S. patent application Ser. No. 09/453,193 filed Dec. 2, 1999 now U.S. Pat. No. 6,766,325, which is herein incorporated by reference in its entirety.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 1999, Microsoft, Inc.

FIELD

The present invention pertains generally to computer-implemented databases, and more particularly to mechanisms providing delta and write-back capability to previously written cells of a database.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

One of the fundamental structures used in OLAP systems is the cube. Cubes are multi-dimensional objects containing measures at specific coordinates specified by dimension members. In this context, a dimension is a structural attribute of a cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. In the dimension hierarchy, lower members of the hierarchy specify the most detailed data in the dimension, while the upper members of the hierarchy identify less detailed, more aggregated data. Thus the dimension members act as indices for identifying a particular cell or range of cells within a multidimensional array. Each cell contains a value or values, also referred to as a measurement. For example, a measurement can comprise budget or sales data such as dollar amounts and quantity sold.

It is often the case that a user desires to perform "what if" analysis using the data provided by OLAP services. In "what-if" analysis, a user interactively changes the data value for one or more cell measurements, and the impact of the change is returned to the user. As an example, a finance manager preparing a budget may perform "what-if" analysis to answer the question "what will happen to profitability if I increase the research and development budget by 10% and cut marketing by 15%?" In this situation, the finance manager would want to adjust the appropriate cells in the OLAP database to reflect the appropriate changes to the underlying data. The updated cell values can then be used to derive values for dependent cells higher in the dimension hierarchy that summarize data contained in lower level cells.

In order to perform what-if analysis in previous systems, the user locates the appropriate cell, and writes the adjusted value for the measurement. In the above example, the finance manager would obtain the current budget values, manually determine the new values, and then cause the system to write the new values into the cell measurement data for the marketing budget and the research and development budget.

There are several disadvantages to this process. First, the old cell measurement data is overwritten, and therefore lost. The only way to recover the old value is for the user to either remember what the value was, and manually restore it, or to obtain the value from a database backup (if such a backup exists). In other words, there is no way to automatically "roll back" a change to the data.

Second, the changes applied by the user are immediately exposed to other users of the system, leading to undesirable effects. For example, assume that two users are using the budget data, the finance manager and a marketing manager. Further assume that the marketing manager wants to determine what the marketing department spent in the last year in order to determine how many new employees to hire. In the above example, after the finance manager has updated the cell data, the changes are also exposed to the marketing manager. The marketing manager will be unaware that the finance manager has updated the data, and will be presented hypothetical, rather than actual data. Thus, the marketing manager's decisions may be flawed because they are not based on actual data.

As can be seen from the above, there is a need in the art for a system that provides the ability to perform "what-if" analysis OLAP databases. The system should provide the ability to change OLAP data without exposing the changes to all users of the system until it is desirable to do so. In addition, the system should provide a means for rolling back selected changes.

SUMMARY

The above-mentioned shortcomings, disadvantages and problems are addressed by the present invention, which will be understood by reading and studying the following specification.

The systems and methods described herein provide the ability to maintain data used in performing "what-if" analysis on data in a database, such as a cube in a multidimensional OLAP database. One aspect of the system is that changes or updates to base cell values of a cube are maintained in a delta cache. The delta cache maintains the changes as deltas from the base cell measurement value. The delta cache is exposed only to a single client of the system, and disappears when the client is terminated. Thus, the base cube data is not altered or corrupted by the system.

A further aspect of the system is that changes or updates to cell values can be maintained in a write-back partition associated with a multidimensional database. The changes are expressed as deltas in the write-back partition, and are exposed to all clients of the system. Again, since the base cell data remains unchanged, it is not corrupted or written over in an undesirable manner.

Whenever cell data is retrieved, the system scans the delta cache and write-back partition to identify cell values that need to be adjusted by applying the delta values in the cache or write-back partition to the base cell data.

A still further aspect of the system is that the system maintains a data structure comprising cell identification values, cell measurement delta values, a timestamp, and a user name. The timestamp and user name can be used to selectively apply the delta values to cells. For example, a user could choose to apply only those delta values that were set by a particular user, during a particular time period, or a combination of the two.

Thus, embodiments of the invention provide advantages not found in previous systems. The base cell data is left unaltered, with changes to the base cell data held in separate partitions or caches. This greatly reduces the chance of corruption of the base cell data as a result of performing what-if analysis. Additionally, the scope of changes can be controlled. Changes can be exposed to only a single user, to multiple users, or to all users of the system. Furthermore, the changes can be selectively applied or rolled back.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, the hardware and the operating environment in conjunction with which embodiments of the invention may be practiced are described. In the second section, a system level overview of an exemplary embodiment of the invention is presented. In the third section, methods of an exemplary embodiment of the invention are provided. Finally, in the fourth section, a conclusion of the detailed description is provided.

Hardware and Operating Environment

Figure 1:
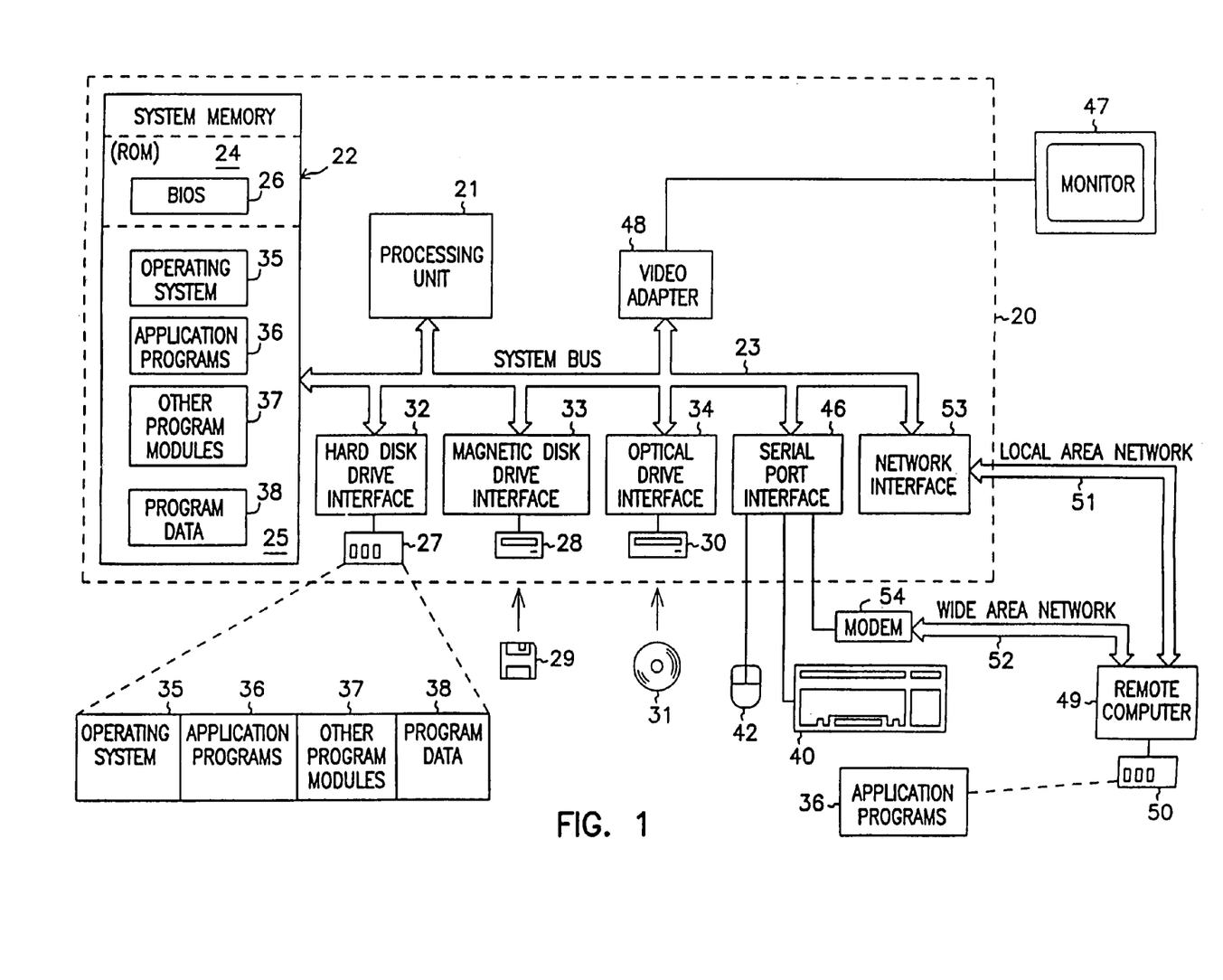
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
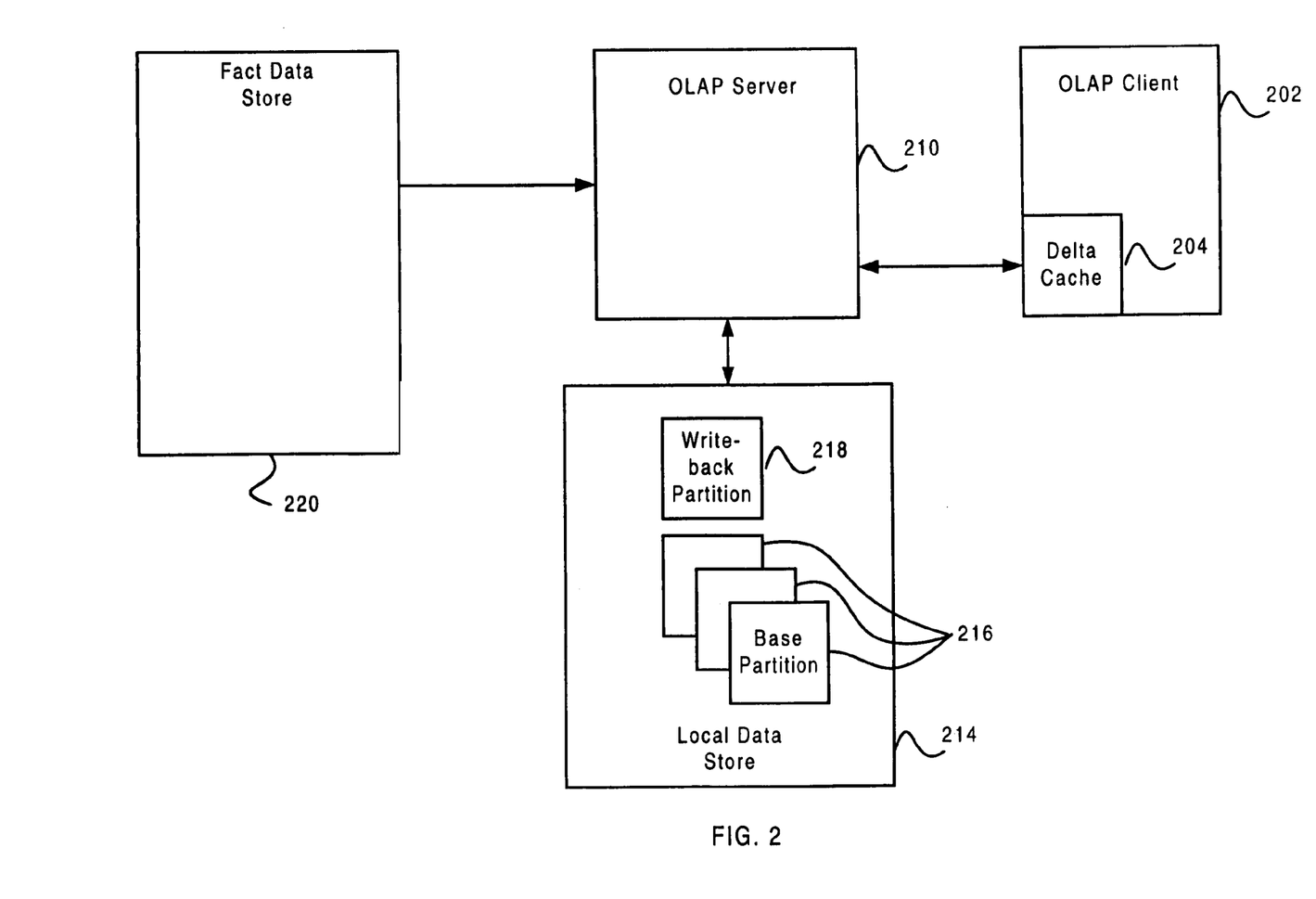
FIG. 2 is a system level overview of various embodiments of the invention.

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. The operating environment includes an OLAP client 202, OLAP server 210, local data store 214, and fact data store 220, all of which operate on the cell data for cubes. The terms "client" and "server" are not meant imply any particular hardware configuration for the system, a client and a server may execute as a system on a single CPU architecture or a multiple CPU architecture. Alternatively the client and server functions can be distributed among several systems communicatively coupled together.

OLAP client 202 is an application program that requires the services of an OLAP system. OLAP client 202 can be any type of application that interacts with the OLAP system, for example, a data mining application, a data warehousing application, a reporting application, a spreadsheet application, etc. OLAP client 202 typically interacts with OLAP server 210 by establishing a session with the OLAP server, followed by issuing OLAP requests. These requests can be queries that request data from a cell or range of cells, or the request can be one that updates cell data as described in further detail below. The request is passed to the OLAP server 210 for processing.

OLAP server 210 receives the requests and controls the processing of requests from one or more client applications. In one embodiment of the invention, the server maintains a local store 214 that contains the cell data used to answer the queries. In one embodiment of the invention, the OLAP server 210 is a version of the SQL Server OLAP product from Microsoft Corporation.

The local store 214 contains records describing the cells that are present in a multidimensional database, with one record used for each cell that actually has measurement data present (i.e. no records exist for those cells having no measurement data). In one embodiment of the invention, local store 214 may be a relational database. In this embodiment, records are stored in a relational table. OLAP server 210 populates local store 214 by reading data from fact data store 220. Fact data store 220 may also be a relational database system. In one embodiment of the invention, the system used is the SQL Server™ Database from Microsoft Corporation. In alternative embodiments of the invention, database systems such as Oracle, Informix or Sybase can be used. The invention is not limited to any particular type of relational database system.

Local store 214, in one embodiment of the invention, is organized into one or more base partitions 216. Each base partition is a logical unit of storage, and data can be organized along partition boundaries. Typically, each of these partitions represents a data source that contributes data to the cube. As an example, consider an OLAP database having a geographical dimension. One base partition might contain cell data for North America, another partition could contain data for Europe, and yet another partition could contain data for Asia. The invention is not limited to any particular organization or number of base partitions. Moreover, base partitions 216 can by any type of partition, the invention is not limited to any particular type. Thus, the partitions 216 can comprise a relational database partition, a multi-dimensional OLAP partition, or a hybrid partition, or any combination thereof. Thus, regardless of the partition type, the base partitions 216 typically contain aggregated cell measurement data as provided by fact data store 220. In other words, the base partitions 216 contain the base, or initial values of the cell measurement data.

Figure 3:
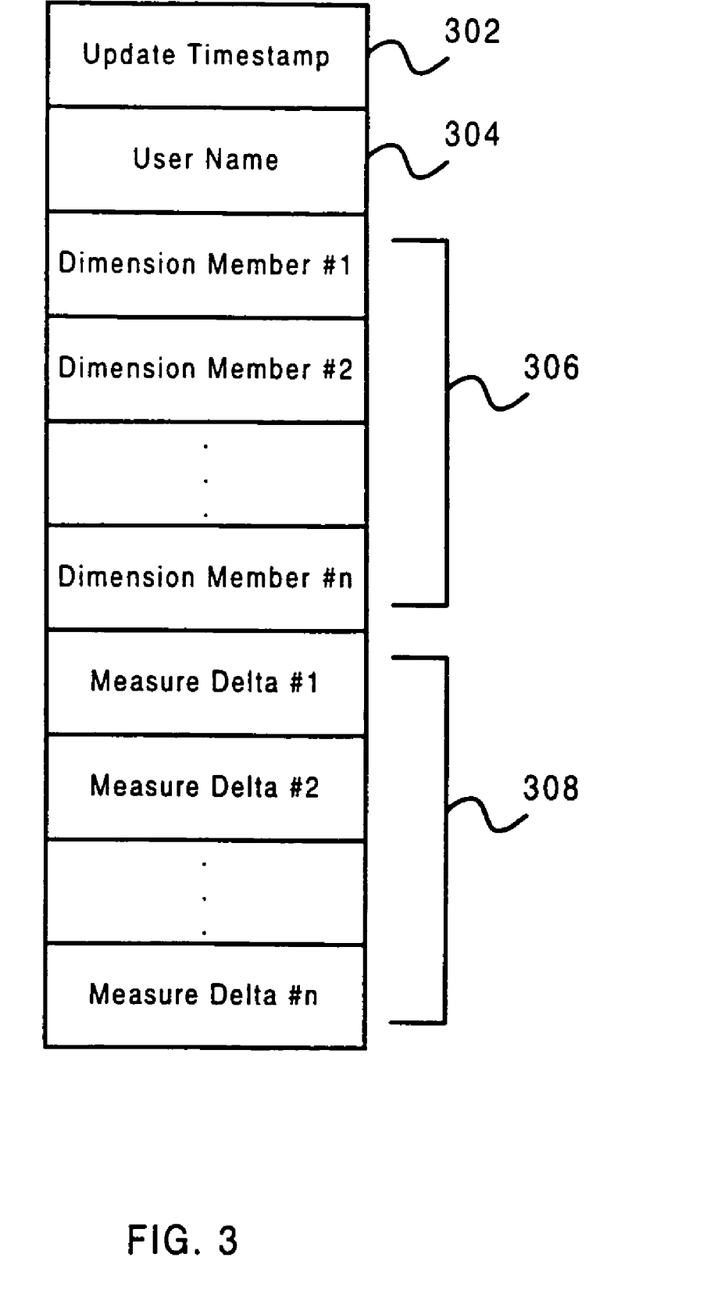
FIG. 3 is a diagram of a data structure maintained according to an embodiment of the invention.

In addition, local data store 214 also includes a write-back partition 218. The write-back partition 218 contains delta values that correspond to particular cell measurement data values contained in the base partitions. The delta values are maintained in write-back tables in the write-back partition. A write-back table data structure 300 according to one embodiment of the invention is shown in FIG. 3, which provides a graphical representation of the data structure. The write-back table data structure 300 includes dimension member identifiers 306, measurement delta values 308, timestamp 302, and user name 304.

The write-back table data structure 300 has a column for each dimension hierarchy defined for the cube, and each column contains a dimension member identifier 306. Dimension member identifiers 306 specify the dimension member coordinates that identify a particular cell. Identifiers 306 can be text strings that contain the actual member names, or they can be unique numeric identifiers associated with each dimension member.

Measurement delta values 308 are the actual delta values that are to be applied to the associated base cell value for the cell identified by identifiers 306. The delta value can be zero (0) or null if no delta is to be applied for a particular measurement value. There is a column in write-back table data structure 300 for each measurement defined for a cell.

Timestamp 302 is a timestamp value that indicates when a row containing at least one delta value for a cell measurement was inserted into the write-back table. The timestamp can be automatically supplied by the database system used to implement the local store 214, or it can be a value generated by the OLAP server using an operating system time value. The invention is not limited to any particular timestamp generation mechanism.

User name 304 is an identifier that identifies the user that caused the row to be inserted into the write-back table. The user name can be a text string containing the user identifier assigned to the user by a database management system or operating system. Alternatively, the user name can be a unique numeric identifier associated with the user.

It is desirable to include a timestamp 302 and user name 304 in the data structure, because it allows a user to selectively apply delta values to the base cell values. For example, a user may wish to include only those deltas generated by a particular user, only those deltas generated within a particular time range, or a combination of the two. In addition, the user can selectively delete rows from the write-back table 218 using the timestamp 302 and user name 304, thus providing a mechanism to "roll back" delta value changes to the base cell values.

In addition, it is desirable to maintain the write-back partition in a relational database. This allows the system to create indexes on the member identifier columns in order to facilitate rapid searches of the write-back partition when determining whether or not delta values need to be applied to base cell measurement data.

Returning to FIG. 2, in one embodiment of the invention, the OLAP system maintains a delta cache 204 within client 202. The delta cache 204 contains cell measurement delta values that are to be applied to base values retrieved from the base partitions 216 and as modified by the write-back partition 218. The distinction between delta values in delta cache 204 and those in write-back partition 218 is in the scope of the delta value. Values in delta cache 204 are local to the OLAP client 202, they are not seen or applied in any other OLAP client application. In contrast, delta values in write-back partition 218 are exposed to all clients of the OLAP server 210. It is desirable to provide a delta cache 204 local to OLAP client 202, because it allows a user to perform what-if analysis that does not affect other users or clients of the OLAP system. The user can modify base cell values by creating delta values for the cells in the delta cache, thus avoiding corrupting the original base cell data maintained in partitions 216. If the user wishes to expose the delta values maintained in delta cache 204 to other users of the system, the user may do so by writing the delta values in delta cache 204 to the write-back partition 218 using a database transaction.

In the embodiment described above, the delta cache 204 is maintained within the OLAP client 202. It is desirable to maintain the delta cache 204 in OLAP client 202 because it reduces the overhead for OLAP server 210, which must be able to rapidly respond to many clients. However, the invention is not so limited, and in an alternative embodiment of the invention the delta cache 204 can be maintained in OLAP server 210.

As an example of the operation of the system described above, consider a cube with the following dimensions: Time, Product, Region and measures Sales and Units Sold. Suppose the value of the data cell for the Sales of Product Milk in the month of August of 1998 in Redmond, Wash. was $25000. Now assume a user wants to change this value to be $28000. Rather then overwriting the existing data entry of $25000 with new value of $28000, OLAP client 202 stores in delta cache 204 a delta value of $3000, representing the difference between the "what-if" value of $28000 minus the base cell value of $25000. Generally, the formula is delta_value=new_value−old_value.

Later, when the user requests the current value of the cell, first the original value of $25000 is fetched from the base partitions 216 for the cube, and then delta cache 204 is searched to determine if any delta values for the cell exist. A delta value of $3000 is obtained, and added to the base value. The result is $28000=$25000+$3000. The general formula is value=original_value+delta.

Now assume that the user desires to expose this delta to all users of the system. OLAP server 210 adds a row entry to write-back cache 218 using the data structure as described above. For this example, the row has the following form:

TABLE 1

| Update Time | User Name | Year | Month | Product Name | State | City | Sales Delta | Units Sold Delta |
|---|---|---|---|---|---|---|---|---|
| 1999/8/7 12:50:36 | redmond/j_doe | 1998 | August | Milk | WA | Redmond | $3000 | 0 |

This section has described the major components of a system according to an embodiment of the invention, including an OLAP server that maintains a write-back partition and an OLAP client that maintains a delta cache.

METHODS OF AN EXEMPLARY EMBODIMENT OF THE INVENTION

In the previous section, a system level overview of the operation of an exemplary embodiment of the invention was described. In this section, the particular methods of the invention performed by an operating environment executing an exemplary embodiment are described by reference to a series of flowcharts shown in FIGS. 4A and 4B. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 4A and 4B are inclusive of the acts required to be taken by an operating environment executing an exemplary embodiment of the invention.

Figure 4A:
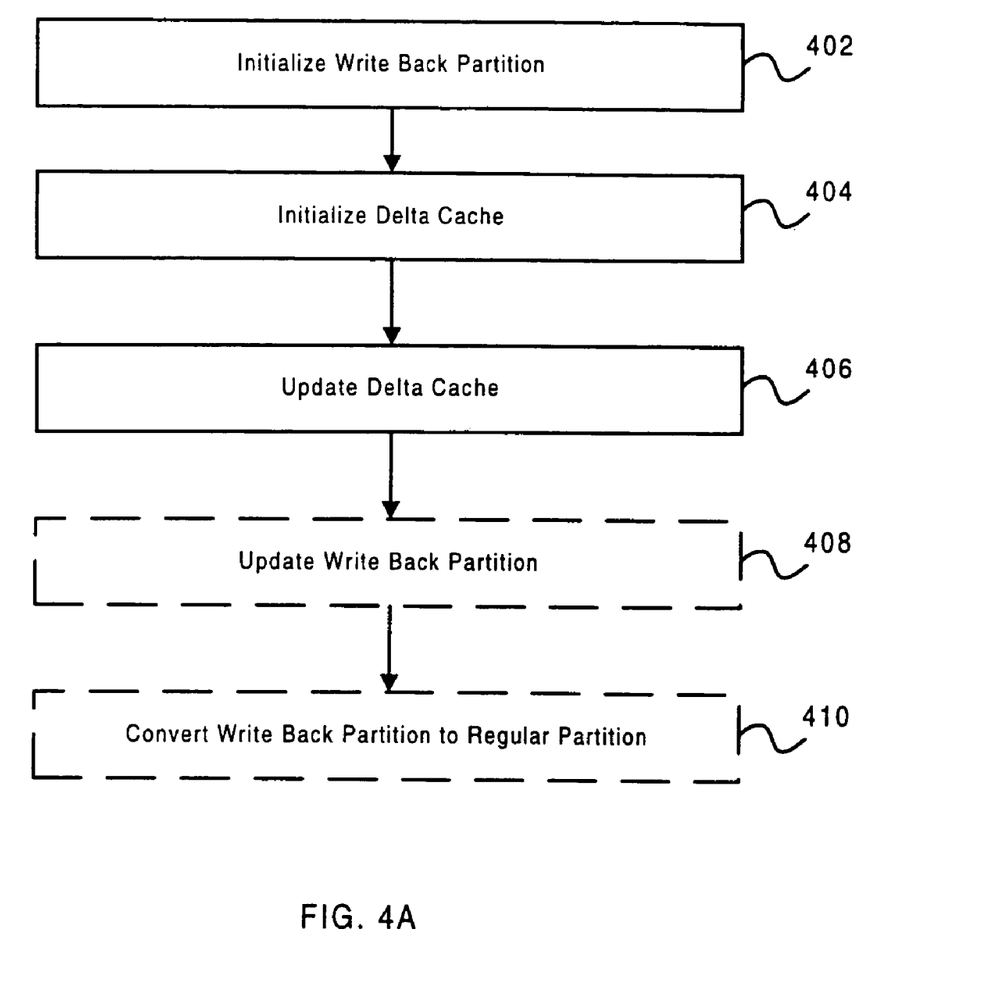
FIGS. 4A and 4B are flowcharts illustrating methods for updating and retrieving write-back data according to an embodiment of the invention.
Figure 4B:
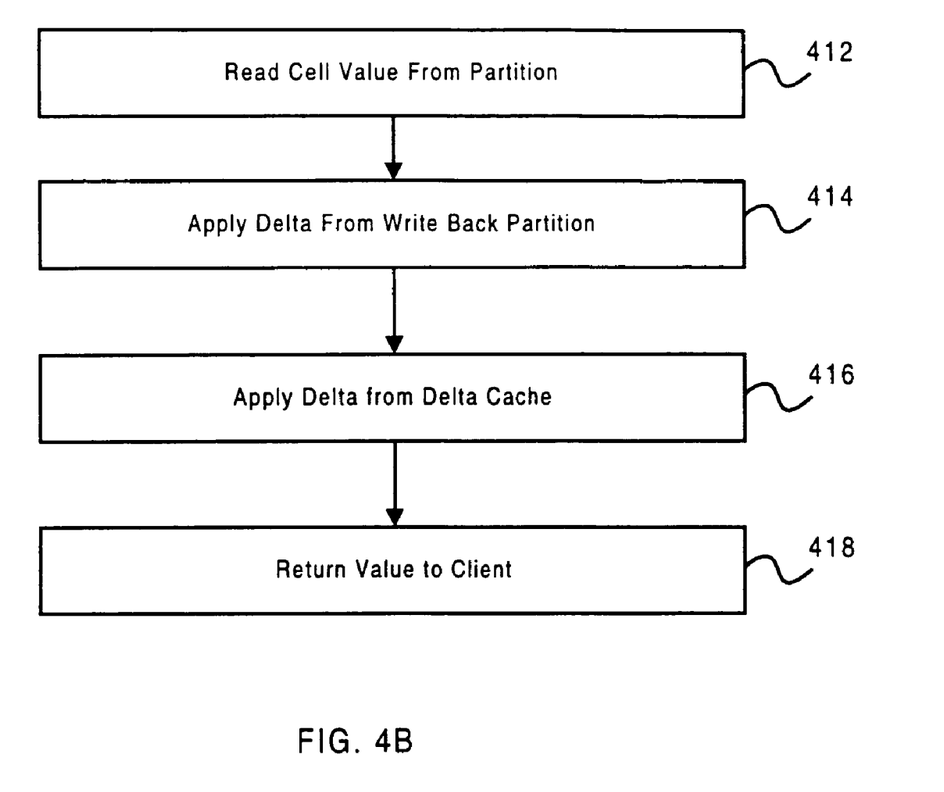

A method for maintaining data to support what-if analysis is described in FIG. 4A. The method begins when a program executing the method, such as OLAP client 202, establishes a session with OLAP server 210 and initializes write-back partition 218 (block 402). Initialization can comprise creating the write-back partition if it does not already exist, and creating write-back tables as necessary to correspond to the dimensions and measurements within a cube being analyzed.

Next, the program executing the method initializes a delta cache (block 404). Again, initialization can comprise creating the delta cache either within the memory managed by an OLAP client application, or within the memory managed by an OLAP server.

After the initialization described above, the delta cache is updated with delta values for one or more specified cell measurements (block 406). The delta values are determined by a user of the system, and are supplied to the system by the user. In one embodiment of the invention, the user supplies the values using an application program interface (API). The delta values represent the difference between the base value as determined from a fact data store, and what the user desires the value to be based on a what-if scenario.

After block 406 has been executed, the delta values contained in the delta cache are available for use by the program owning the delta cache. Other users of the system do not see the changes. Block 408 and block 410 are optional actions (indicated by a dashed box) that are carried out if a user desires to expose the changes to other users of the OLAP cube data.

At block 408, the delta values in the delta cache are written to the write-back partition. In one embodiment of the invention, a database transaction is used to write the values to a row in a table having the format described above in reference to FIG. 3. After the transaction has been committed, the delta values are available for use by all users and clients of an OLAP server executing the method of the invention. At this point, it is still possible for the delta values to be "rolled back" by deleting the rows from the write-back table, using the timestamp and/or user name as keys to identify the rows to be deleted.

Finally, at optional block 410, a system executing the method can convert the write-back partition to a regular base partition. As discussed above, it is desirable to maintain the write-back partition as a table in a relational database. Conversion of the write-back partition can be accomplished by creating a new multi-dimensional or hybrid partition, and converting the contents of the write-back partition to the new storage mode and redesigning the aggregations for the new storage mode. After a write-back partition is converted, it is emptied. The newly converted partition then contributes data to the cube in the same manner as any of the other base partitions. As those of skill in the art will appreciate, once a write-back partition has been converted, it is not possible to roll back the changes represented by the delta values, because the user name and timestamp identifying information will be lost during the conversion process.

The method described above in FIG. 4A illustrates a mechanism for supplying delta values to be applied to cube measurement data. In FIG. 4B, a method of applying the delta values is illustrated. The method begins when a cell measurement value is read from a base partition that provides data for a cube (block 412). The cell measurement value may be read in response to a query from a user performing what-if analysis, or in response to a request from a reporting application.

Next, a system executing the method scans for applicable deltas from a write-back partition, and applies the delta to the cell measurement value if a delta exists (block 414). A delta value is considered applicable if the dimension members for the delta are the same as the dimension members used for the cell requested at block 412, or if the delta is for a dimension member that is aggregated by a more detailed member existing in the dimension hierarchy below the cell value requested at block 412. In the latter case, all delta values for cell measurements in the dimension hierarchy that are lower than the requested cell must be applied in order to obtain the correct cell measurement value at the requested level.

After delta values in the write-back partition have been applied, the system executing the method scans the delta values residing in the delta cache local to a client application (block 416). Like block 414, the delta values at this block are applied if they are for a cell at the same level as the requested base cell or lower (i.e. more detailed) in the dimension hierarchy.

Finally, after all delta values have been applied, the resulting value is returned to the user (block 418). Thus, the returned cell measurement value will represent the base cell value as adjusted by delta values in the write-back partition that are exposed to all users of the cube data, and further adjusted by delta values that exposed only to a single client performing a what-if analysis.

CONCLUSION

Systems and methods for maintaining data used in performing what-if analysis have been described. The systems and methods of the invention provide advantages not found in previous systems. For example, the systems and methods of embodiments of the invention provide client applications the ability to adjust data for a particular end user without corrupting or changing the base version of the data that is supplied to other clients of the OLAP server A further advantage of the embodiments of the invention is that changes to the base measurement values of a cube can be selectively applied and rolled back. Thus a user can include only those deltas that the user wishes to apply in their what-if analysis.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the systems and methods have been described in the context of a multidimensional OLAP database system, the systems and methods of the invention can be applied to any system in which "what-if" analysis is used. As an example, the systems and methods of the invention can be applied to relational and object oriented databases. The terminology used in this application with respect creating and maintaining delta values for cell measurement data is meant to include all of these environments. Therefore, it is manifestly intended that this invention be limited only by the following claims and equivalents thereof.

We claimed:

1. A computerized system for what-if analysis comprising:
   a first application;
   a data store in communication with the first application, the data store comprising a base partition that stores cell data and a write-back partition that stores a first delta value corresponding to the cell data, the first delta value representing the difference between an original value of the cell data and a corresponding first what-if value of the cell data;
   a plurality of second applications; and
   a plurality of delta caches, each delta cache of the plurality of delta caches associated and in communication with one of the plurality of second applications, each delta cache stores a second delta value corresponding to the cell data, the second delta value representing the difference between the first what-if value of the cell data and a corresponding second what-if value of the cell data.

2. The computerized system as recited in claim 1, wherein each of the plurality of delta caches is associated with a user and the system applies the first delta value to all user requests associated with the cell data and applies only the second delta value of the delta cache associated with a first user and does not apply the second delta value of the delta cache associated with the other users, whereby each user may implement individual what-if values and may share what-if values with other users.

3. The computerized system as recited in claim 1, wherein, for one of the plurality of second applications, a what-if value is determined by applying the first delta value and the second delta value of the delta cache corresponding to the one of the second applications to the value corresponding to the cell data and not applying the second delta values of the delta caches corresponding to the other of the second applications to the value corresponding to the cell data.

4. The computerized system as recited in claim 1, wherein each delta cache is maintained by a multidimensional database.

5. The computerized system as recited in claim 1, wherein the write-back partition is maintained by a multidimensional database.

6. The computerized system as recited in claim 1, wherein each delta cache is maintained by a relational database.

7. The computerized system as recited in claim 1, wherein the write-back partition is maintained by a relational database.

8. The computerized system as recited in claim 1, further comprising a server computer that executes the first application.

9. The computerized system as recited in claim 1, further comprising a plurality of client computers, each of the plurality of client computers executes one of the plurality of second applications.

10. The computerized system as recited in claim 1, wherein each delta cache of the plurality of delta caches is maintained by an online analytical processing application.

11. The computerized system as recited in claim 1, wherein the write-back partition is maintained by an online analytical processing application.

12. The computerized system as recited in claim 1, wherein each of the first and second applications comprises an online analytical processing application.

13. A computerized method for what-if analysis comprising:
   maintaining a data store comprising a base partition storing cell data and a write-back partition storing a first delta value corresponding to the cell data, the first delta value representing the difference between an original value of the cell data and a corresponding first what-if value of the cell data; and
   maintaining a plurality of delta caches, each delta cache of the plurality of delta caches storing a second delta value corresponding to the cell data, the second delta value representing the difference between the first what-if value of the cell data and a corresponding second what-if value of the cell data.

14. The computerized method as recited in claim 13, further comprising applying the first delta value and the second delta value stored in one of the plurality of delta caches to the original value of the cell data and not applying the second delta values stored in the other of the plurality of delta caches to the original value of the cell data.

15. The computerized method as recited in claim 13, wherein each of the plurality of delta caches is associated with a user and the method further comprises applying the first delta value to all user requests associated with the cell data and applying only the second delta value of the delta cache associated with a user and not applying the second delta value of the delta cache associated with the other users.

16. The computerized method as recited in claim 13, wherein maintaining the plurality of delta caches comprises maintaining the plurality of delta caches with a multidimensional database.

17. The computerized method as recited in claim 13, wherein maintaining the data store comprises maintaining the data store with a multidimensional database.

18. The computerized method as recited in claim 13, wherein maintaining the plurality of delta caches comprises maintaining the plurality of delta caches with a relational database.

19. The computerized method as recited in claim 13, wherein maintaining the data store comprises maintaining the data store with a relational database.

20. The computerized method as recited in claim 13, wherein maintaining the plurality of delta caches comprises maintaining the plurality of delta caches with an online analytical processing application.

21. The computerized method as recited in claim 13, wherein maintaining the data store comprises maintaining the data store with an online analytical processing application.

22. The computerized method as recited in claim 13, wherein each of the plurality of delta caches storing a second delta value is associated with a user and for each request from a user for what-if analysis the method further comprises:
    reading a cell value from the base partition;
    reading the first delta value from the write-back partition;
    reading the second delta value associated with the user;
    applying the first delta value and the second delta value associated with the user to the cell value to yield an adjusted value and not applying the second delta value associate with other users to the cell value; and
    returning the adjusted value to the user.

23. The computerized method as recited in claim 13, wherein each of the plurality of delta caches storing a second delta value is associated with a user and the method further comprises applying one of the second delta values to the first delta value whereby each user may access the second delta value associated with the user.

24. A computerized method for processing requests for what-if analysis from a plurality of users, the method comprising:
    maintaining a first delta value corresponding to an original value that is applied to all of the plurality of users; and
    maintaining a set of second delta values corresponding to the original value, each of the second delta values is associated with one of a plurality of users and is applied only to the user associated with the second delta value.

25. The computerized method as recited in claim 24, further comprising:
    applying the first delta value to the original value; and
    for each of the plurality of users, applying, of the set of second delta values, only the second delta value associated with the user to the original value.

26. The computerized method as recited in claim 24, further comprising applying one of the second delta values associated with a first user of the plurality of users to the first delta value, whereby all of the plurality of users may access the second delta value associated with the first user.

27. At least one computer-readable medium having computer-readable instructions thereon for what-if analysis, the computer-readable instruction when executed on at least one processor causing the at least one processor to perform:
    maintaining a data store comprising a base partition storing cell data and a write-back partition storing a first delta value corresponding to the cell data, the first delta value representing the difference between an original value of the cell data and a corresponding first what-if value of the cell data; and
    maintaining a plurality of delta caches, each delta cache of the plurality of delta caches storing a second delta value corresponding to the cell data, the second delta value representing the difference between the first what-if value of the cell data and a corresponding second what-if value of the cell data.

28. The at least one computer-readable medium as recited in claim 27, wherein the instructions further cause the at least one processor to perform applying the first delta value and the second delta value stored in one of the plurality of delta caches to the original value of the cell data and not applying the second delta values stored in the other of the plurality of delta caches to the original value of the cell data.

29. The at least one computer-readable medium as recited in claim 27, wherein each of the plurality of delta caches is associated with a user and wherein the instructions further cause the at least one processor to perform applying the first delta value to all user requests associated with the cell data and applying only the second delta value of the delta cache associated with a user and not applying the second delta value of the delta cache associated with the other users.

30. The at least one computer-readable medium as recited in claim 27, wherein maintaining the plurality of delta caches comprises maintaining the plurality of delta caches with a multidimensional database.

31. The at least one computer-readable medium as recited in claim 27, wherein maintaining the data store comprises maintaining the data store with a multidimensional database.

32. The at least one computer-readable medium as recited in claim 27, wherein maintaining the plurality of delta caches comprises maintaining the plurality of delta caches with a relational database.

33. The at least one computer-readable medium as recited in claim 27, wherein maintaining the data store comprises maintaining the data store with a relational database.

34. The at least one computer-readable medium as recited in claim 27, wherein maintaining the plurality of delta caches comprises maintaining the plurality of delta caches with an online analytical processing application.

35. The at least one computer-readable medium as recited in claim 27, wherein maintaining the data store comprises maintaining the data store with an online analytical processing application.

36. The at least one computer-readable medium as recited in claim 27, wherein each of the plurality of delta caches storing a second delta value is associated with a user and for each request from a user for what-if analysis the instructions further cause the at least one processor to perform:
    reading a cell value from the base partition;
    reading the first delta value from the write-back partition;
    reading the second delta value associated with the user;
    applying the first delta value and the second delta value associated with the user to the cell value to yield an adjusted value and not applying the second delta value associate with other users to the cell value; and
    returning the adjusted value to the user.

37. The at least one computer-readable medium as recited in claim 27, wherein each of the plurality of delta caches storing a second delta value is associated with a user and wherein the instructions further cause the at least one processor to perform applying one of the second delta values to the first delta value whereby each user may access the second delta value associated with the user.

38. At least one computer-readable medium having computer-readable instructions thereon for processing requests for what-if analysis from a plurality of users, the computer-readable instruction when executed on at least one processor causing the at least one processor to perform:
    maintaining a first delta value corresponding to an original value that is applied to all of the plurality of users; and
    maintaining a set of second delta values corresponding to the original value, each of the second delta values is associated with one of a plurality of users and is applied only to the user associated with the second delta value.

39. The at least one computer-readable medium as recited in claim 38, wherein the instructions further cause the at least one processor to perform:

applying the first delta value to the original value; and for each of the plurality of users, applying, of the set of second delta values, only the second delta value associated with the user to the original value.

40. The at least one computer-readable medium as recited in claim 38, wherein the instructions further cause the at least one processor to perform applying one of the second delta values associated with a first user of the plurality of users to the first delta value, whereby all of the plurality of users may access the second delta value associated with the first user.

* * * * *